(12) United States Patent
Shirai et al.

(10) Patent No.: US 7,562,521 B2
(45) Date of Patent: Jul. 21, 2009

(54) SCR MUFFLER

(75) Inventors: Daisuke Shirai, Tokyo (JP); Naobumi Yamada, Tokyo (JP); Hitoshi Hiramoto, Tokyo (JP); Isamu Kanaya, Ageo Saitama (JP); Hiroki Ueno, Ageo Saitama (JP)

(73) Assignees: Tokyo Roki Co., Ltd., Kanagawa (JP); Nissan Diesel Motor Co., Ltd., Saitama (JP)

( * ) Notice: Subject to any disclaimer, the term of this patent is extended or adjusted under 35 U.S.C. 154(b) by 298 days.

(21) Appl. No.: 10/588,203

(22) PCT Filed: Feb. 2, 2005

(86) PCT No.: PCT/JP2005/001456
§ 371 (c)(1),
(2), (4) Date: Nov. 21, 2006

(87) PCT Pub. No.: WO2005/073526
PCT Pub. Date: Aug. 11, 2005

(65) Prior Publication Data
US 2007/0169467 A1    Jul. 26, 2007

(30) Foreign Application Priority Data
Feb. 2, 2004 (JP) .............................. 2004-026074
Feb. 12, 2004 (JP) .............................. 2004-035448

(51) Int. Cl.
*F01N 3/00* (2006.01)
*F01N 3/10* (2006.01)
(52) U.S. Cl. .......................................... 60/286; 60/301
(58) Field of Classification Search .................. 60/286, 60/295, 301, 317, 319, 324; 239/129, 395–434.5
See application file for complete search history.

(56) References Cited

U.S. PATENT DOCUMENTS 5,272,871 A * 12/1993 Oshima et al. ................ 60/274

(Continued)

FOREIGN PATENT DOCUMENTS

EP    0 537 968 A1    4/1993

(Continued)

*Primary Examiner*—Thomas E Denion
*Assistant Examiner*—Jonathan Matthias
(74) *Attorney, Agent, or Firm*—Harness, Dickey & Pierce, PLC

(57) ABSTRACT

The flow of exhaust gas flowing through the SCR muffler becomes good, thus improving the efficiency of purging nitrogen oxide (NOx) contained in exhaust gas. Further, vibrations that are caused by vibrations of the vehicle, exhaust gas, and the like, to which a reducing agent, etc., supplying nozzle is subject, are suppressed or reduced, thus improving the efficiency of an SCR catalyst purging nitrogen oxide (NOx) and the durability of the reducing agent, etc., supplying nozzle. The SCR muffler comprises an SCR catalyst 1 for selectively reducing and purging nitrogen oxide (NOx) contained in exhaust gas; an exhaust pipe 2 that allows the exhaust gas to flow into the SCR catalyst; and a reducing agent, etc., supplying means 3 that supplies a reducing agent or a reducing agent precursor to the exhaust gas. A plate 4 having air holes 5 which disperse and make a flow of the exhaust gas uniform is provided downstream of the reducing agent, etc., supplying means and upstream of the SCR catalyst. The air holes 5 are arranged in only an area greater in diameter than the exhaust pipe and in a staggered fashion so as to form concentric circles. Further, the reducing agent, etc., supplying nozzle 30 as the means 3 is inserted through a plate 40 having air holes 5, and the plate is held in the exhaust pipe.

1 Claim, 3 Drawing Sheets

U.S. PATENT DOCUMENTS

| | | | |
|---|---|---|---|
| 5,412,946 A * | 5/1995 | Oshima et al. | 60/286 |
| 5,628,186 A | 5/1997 | Schmelz et al. | |
| 6,391,267 B1 * | 5/2002 | Martin et al. | 422/173 |
| 6,449,947 B1 * | 9/2002 | Liu et al. | 60/286 |
| 6,712,869 B2 * | 3/2004 | Cheng et al. | 55/418 |
| 6,722,123 B2 * | 4/2004 | Liu et al. | 60/286 |
| 6,745,562 B2 * | 6/2004 | Berriman et al. | 60/324 |
| 6,887,294 B2 * | 5/2005 | Kanematsu | 55/418 |
| 6,935,461 B2 * | 8/2005 | Marocco | 181/270 |
| 7,152,396 B2 * | 12/2006 | Cheng | 60/286 |
| 2002/0162322 A1 * | 11/2002 | Ganzmann et al. | 60/286 |
| 2003/0110763 A1 * | 6/2003 | Pawson et al. | 60/286 |
| 2004/0237511 A1 * | 12/2004 | Ripper et al. | 60/286 |

FOREIGN PATENT DOCUMENTS

| | | |
|---|---|---|
| GB | 2 386 845 A | 10/2003 |
| JP | 05-106430 | 4/1993 |
| JP | 5-106430 A | 4/1993 |
| JP | 08-509795 | 10/1996 |
| JP | 8-509795 A | 10/1996 |
| WO | WO-94/27035 A1 | 11/1994 |

* cited by examiner

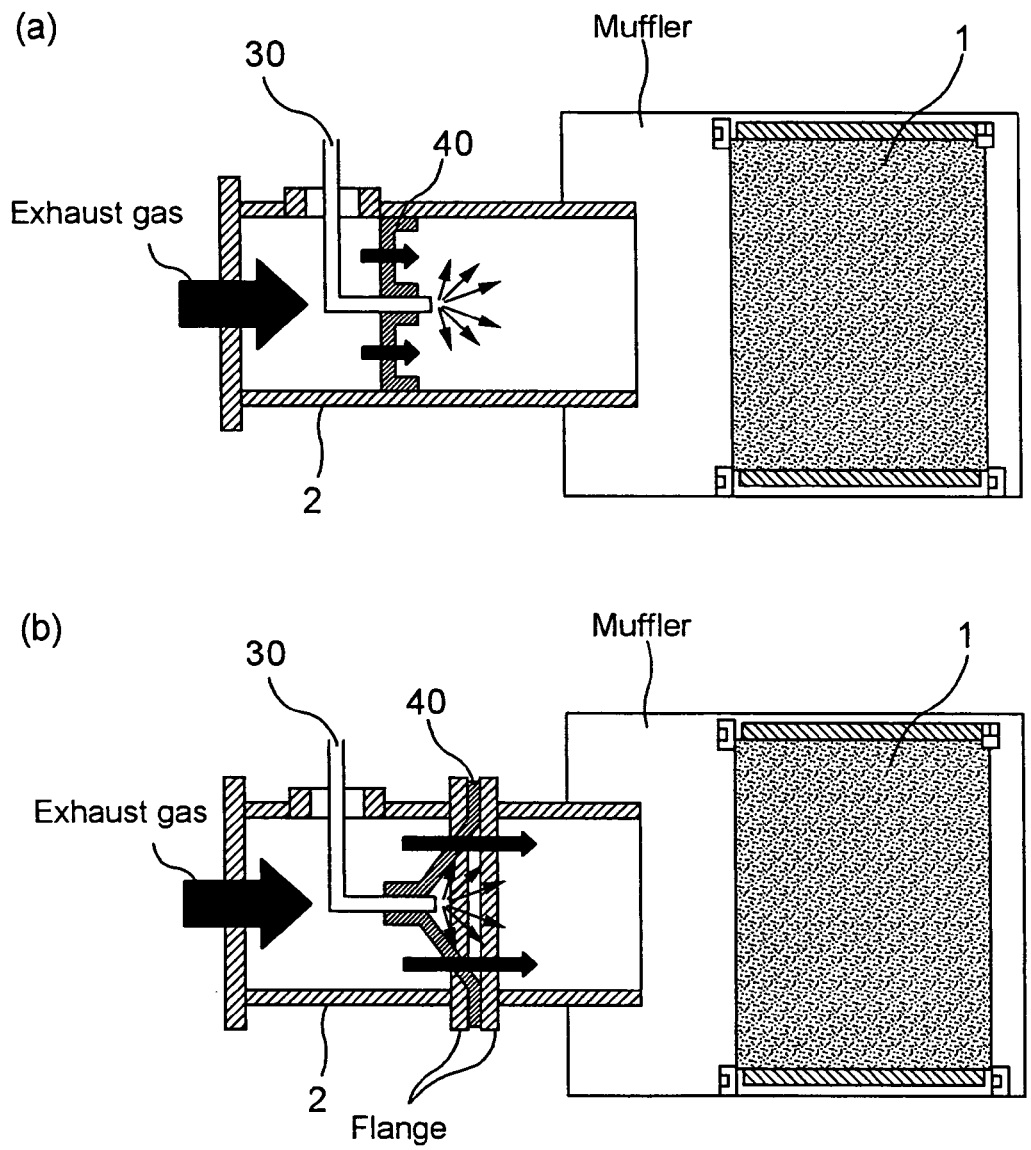
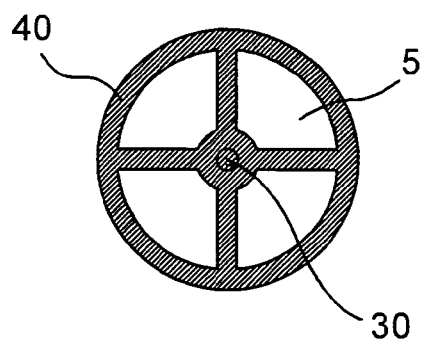
FIG. 7

SCR MUFFLER

CROSS-REFERENCE TO RELATED APPLICATIONS

The present application claims priority from Japanese Patent Application Nos. 2004-26074 and 2004-35448 filed respectively on Feb. 2 and Feb. 12, 2004, which are herein incorporated by reference.

TECHNICAL FIELD

The present invention relates to an SCR muffler with an SCR catalyst for selectively reducing and purging nitrogen oxide (NOx) contained in exhaust gas.

BACKGROUND ART

In these years, as to particulate matter (PM) and nitrogen oxide (NOx) contained in exhaust gas exhausted from internal combustion engines such as diesel-engines, the necessity of purging them is high because of the problem of environment pollution such as acid rain and photochemical smog.

Accordingly, there is conventional technology in which, in the exhaust system of an internal combustion engine, a reducing agent or a reducing agent precursor such as urea water is supplied by spraying to exhaust gas via a reducing agent, etc., supplying nozzle from upstream of an SCR muffler having a selective reduction SCR (Selective Catalytic Reduction) catalyst, thereby selectively reducing and purging nitrogen oxide (NOx) contained in exhaust gas by the SCR catalyst. See, e.g., Japanese Patent Application Laid-Open Publication No. 2001-20724.

Furthermore, there is a system in which an air hole such as a punching hole is formed in an exhaust pipe to disperse and make the flow of exhaust gas uniform. See, e.g., Japanese Utility Model Application Laid-Open Publication No. H02-115912.

However, with such conventional technology, there is the problem that due to the flow of exhaust gas being in a poor condition, the efficiency of purging nitrogen oxide (NOx) is low at the time of transient operation and also, the efficiency is low in the entire range of a low temperature to a high temperature.

In particular, with the case of supplying urea water as a reducing agent precursor, there is also the problem that since the flow of exhaust gas is in a poor condition, urea precipitates in an exhaust pipe, etc., located upstream of an SCR catalyst, thus greatly lowering the efficiency of purging nitrogen oxide (NOx).

Moreover, with conventional technology, there is the problem that since a reducing agent, etc., supplying nozzle is influenced by vibrations of the vehicle, exhaust gas, and the like to vibrate, it is difficult to supply, by spraying, a reducing agent or a reducing agent precursor such as urea water to exhaust gas in such a way that it is dispersed uniformly, and that the efficiency of an SCR catalyst purging nitrogen oxide (NOx) is low.

Also, there is the problem that because of such vibrations caused by vibrations of the vehicle, exhaust gas, and the like, a reducing agent, etc., supplying nozzle is subject to damage and deformation and is low in durability.

DISCLOSURE OF THE INVENTION

Accordingly, an object of the present invention is to provide an SCR muffler that can make the flow of exhaust gas be in a good condition, thereby improving the efficiency of purging nitrogen oxide (NOx) contained in exhaust gas.

Further, another object of the present invention is to provide an SCR muffler that can suppress or reduce vibrations that are caused by vibrations of the vehicle, exhaust gas, and the like to which a reducing agent, etc., supplying nozzle is subject, thereby improving the efficiency of an SCR catalyst purging nitrogen oxide (NOx) contained in exhaust gas and the durability of the reducing agent, etc., supplying nozzle.

The present invention to solve the above problems is an SCR muffler which comprises an SCR catalyst for selectively reducing and purging nitrogen oxide (NOx) contained in exhaust gas; an exhaust pipe that allows the exhaust gas to flow into the SCR catalyst; and a reducing agent, etc., supplying means that supplies a reducing agent or a reducing agent precursor to the exhaust gas. The SCR muffler is characterized in that a plate having air holes which disperse and make a flow of the exhaust gas uniform is provided downstream of the reducing agent, etc., supplying means and upstream of the SCR catalyst.

The SCR muffler of the invention may be characterized in that the plate is attached to an end of the exhaust pipe and greater in diameter than the exhaust pipe, and in that the air holes are arranged in only an area greater in diameter than the exhaust pipe.

The plate may have a cross section shaped like a convex tapering upstream.

Another implementation of the invention is an SCR muffler which comprises an SCR catalyst for selectively reducing and purging nitrogen oxide (NOx) contained in exhaust gas; an exhaust pipe that allows the exhaust gas to flow into the SCR catalyst and has air holes in its portion to be inserted into the muffler; and a reducing agent, etc., supplying means that supplies a reducing agent or a reducing agent precursor to the exhaust gas. The SCR muffler is characterized in that only the exhaust pipe is closed by a plate without an air hole.

The plate may have a cross section shaped like a convex tapering upstream.

Yet another implementation of the invention is an SCR muffler which comprises an SCR catalyst for selectively reducing and purging nitrogen oxide (NOx) contained in exhaust gas; an exhaust pipe that allows the exhaust gas to flow into the SCR catalyst; and a reducing agent, etc., supplying nozzle that supplies a reducing agent or a reducing agent precursor to the exhaust gas. The SCR muffler is characterized in that the reducing agent, etc., supplying nozzle is inserted through a plate having air holes and the plate is held in the exhaust pipe.

BRIEF DESCRIPTION OF THE DRAWINGS

FIG. 6 is a basic schematic view of an SCR muffler according to a second embodiment of the invention; and FIG. 7 is a projection view of the inside of the exhaust pipe according to the second embodiment of the invention.

EXPLANATION OF REFERENCE NUMERALS

1 SCR catalyst, 2 Exhaust pipe, 3(30) Reducing agent, etc., supplying means (reducing agent, etc., supplying nozzle), 4, 40 Plate, 5 Air hole

BEST MODE FOR CARRYING OUT THE INVENTION

The best mode for implementing an SCR muffler of the present invention will be described below with reference to the accompanying drawings.

FIRST EMBODIMENT

Figure 1:
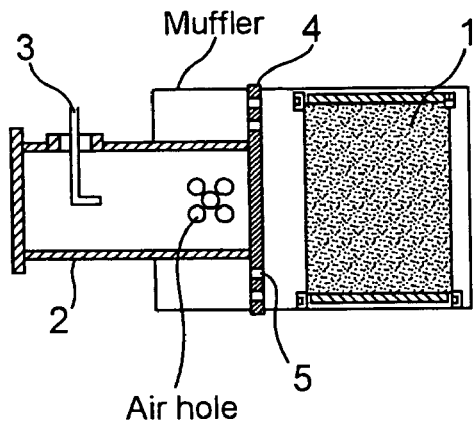
FIG. 1 is a basic schematic view of an SCR muffler according to a first embodiment of the present invention.

FIG. 1 is a basic schematic view of an SCR muffler according to a first embodiment of the present invention, which comprises an SCR catalyst 1 for selectively reducing and purging nitrogen oxide (NOx) contained in exhaust gas, an exhaust pipe 2 that allows exhaust gas to flow into the SCR catalyst 1, and a reducing agent, etc., supplying means 3 that supplies a reducing agent or a reducing agent precursor to exhaust gas and which is provided with a plate 4 downstream of the reducing agent, etc., supplying means 3 and upstream of the SCR catalyst 1, the plate 4 having air holes 5 for dispersing and making the flow of exhaust gas uniform. Although FIG. 1 shows that the exhaust pipe 2 is inserted in the inside of the muffler, the exhaust pipe 2 and the muffler may be integrally formed instead of the exhaust pipe 2 being inserted in the muffler. Further, it does not matter whether to be of a serial-type or parallel-type and whether to be shaped round or cylindrical.

As shown in FIG. 1, this embodiment describes that the exhaust pipe 2 and the muffler together are closed by the plate 4 having the air holes 5, but the invention is not limited to such a configuration. That is, the plate 4 having the air holes 5 may be disposed at the downstream end outlet of the exhaust pipe 2 close to the SCR catalyst 1, or may be disposed at a position in the exhaust pipe 2 as long as the position is located downstream of the reducing agent, etc., supplying means 3 and upstream of the SCR catalyst 1. Alternatively, it may be provided in the muffler itself instead of in the exhaust pipe 2.

Figure 2:
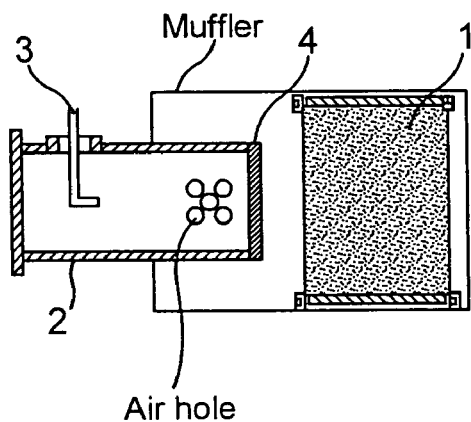
FIG. 2 is a schematic view of an SCR muffler in which only an exhaust pipe 2 is closed by a plate without an air hole.

As shown in FIG. 2, where the exhaust pipe 2 is inserted in the inside of the muffler and where its inserted portion has air holes, the invention may have a configuration in which only the exhaust pipe 2 is closed by a plate 4 without an air hole.

In the SCR muffler with such a configuration, exhaust gas passes through the exhaust pipe 2 in a direction from upstream to downstream and flows into the SCR catalyst 1. Exhaust gas is exhausted from an internal combustion engine such as a diesel-engine and contains as toxic substances unburned hydrocarbon (HC), carbon monoxide (CO), and nitrogen oxide (NOx) such as nitric monoxide (NO) and nitric dioxide ($NO_2$). Such exhaust gas is supplied via the reducing agent, etc., supplying means 3 with a reducing agent or a reducing agent precursor during the time before flowing into the SCR catalyst 1. The reducing agent or reducing agent precursor includes a reducing agent precursor such as a substance that liberates a reducing agent, as well as a reducing agent itself, and may be any of hydrocarbon, cyanurate, ammonia, ammonium carbonate, ammonium carbamate, urea, and combinations of them. Furthermore, the reducing agent or reducing agent precursor may be in the form of any of solid, liquid, and gas.

For example, the reducing agent, etc., supplying means 3 may supply ammonia itself as a reducing agent, but ammonia is strong in smell and high in toxicity at a relatively high concentration. Hence, urea water of low toxicity as a reducing agent precursor is preferably supplied by spraying. In this case, urea in urea water is mixed and in contact with exhaust gas in the exhaust pipe, and is thermally or hydrolytically resolved to liberate ammonia, a reducing agent. In the present embodiment, urea water is supplied by spraying from outside the exhaust pipe to exhaust gas in the exhaust pipe via an adding nozzle.

Thereafter, exhaust gas flows through the exhaust pipe further in the downstream direction, and reaches the plate 4 having the air holes 5 upstream of the SCR catalyst 1.

Figure 3:
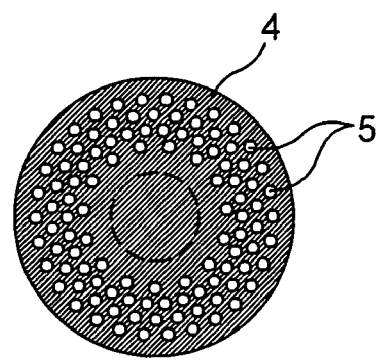
FIG. 3 is a sectional view of a plate 4 having air holes 5 according to the first embodiment of the invention.

FIG. 3 is a sectional view of the plate 4 having the air holes 5 according to the first embodiment of the invention. No air holes 5 are disposed in the center that closes the exhaust pipe 2, and a plurality of circular air holes 5 are arranged in a staggered fashion in only an outward area from an area greater in diameter than the mouth of the exhaust pipe so as to form concentric circles.

The air hole 5 of the present invention may be shaped in any of a circle, ellipse, strip, fan, and other polygons, but preferably like a punching hole. The air holes 5 may be a mixture of holes in these shapes. The size and number of the air holes 5 can be arbitrary. Further, the air holes 5 are preferably arranged uniformly and symmetrically, and also are preferably arranged in only an area greater in diameter than the exhaust pipe.

Moreover, the plate 4 of the invention may be shaped in any of a circle, ellipse, square, cone, and other polygons, and maybe flat, convex, or in any shape. Also, the convex sectional shape of the convex plate may take any shape such as a half circle or a triangular pyramid, and its direction can be in the downstream direction, but is preferably in the upstream direction. Preferably, the plate 4 has such a size as to close the mouth of the exhaust pipe 2 and the muffler and is greater in diameter than the exhaust pipe 2 as mentioned above. There may be one plate 4 or a plurality of plates 4.

As such, in this embodiment, since the exhaust pipe 2 is completely closed by the center of the plate 4 having no air holes 5 disposed therein, exhaust gas that has flown through the exhaust pipe and reached the plate 4 cannot directly pass through the plate 4 and is blocked at the plate surface. Hence, the exhaust gas passes through air holes in part of the exhaust pipe 2 inserted in the muffler and flows outside the exhaust pipe, and then, flows through the space between the muffler and the exhaust pipe 2 and reaches the plate 4 again.

Thereafter, the exhaust gas having flown outside the exhaust pipe passes through the air holes 5 in the outer area of the plate 4 and flows into the SCR catalyst 1 downstream thereof, in which nitrogen oxide (NOx) contained in the exhaust gas is absorbed into the SCR catalyst 1.

The SCR (Selective Catalytic Reduction) catalyst 1 may be made of any of titanium dioxide ($TiO_2$), vanadium pentoxide ($V_2O_5$), tungstic trioxide ($WO_3$), molybdenum trioxide ($MoO_3$), silicon dioxide ($SiO_2$), sulfate, zeolite, etc., and combinations thereof. Also, the SCR catalyst 1 may be cased, or supported by a catalyst support having a honeycomb structure.

The SCR catalyst 1 selectively reduces and purges nitrogen oxide (NOx) contained in exhaust gas and transforms it into nitrogen and water, which are gentle to the environment. The efficiency of purging nitrogen oxide (NOx) is affected by the flow of exhaust gas flowing into the SCR catalyst 1.

Figure 4:
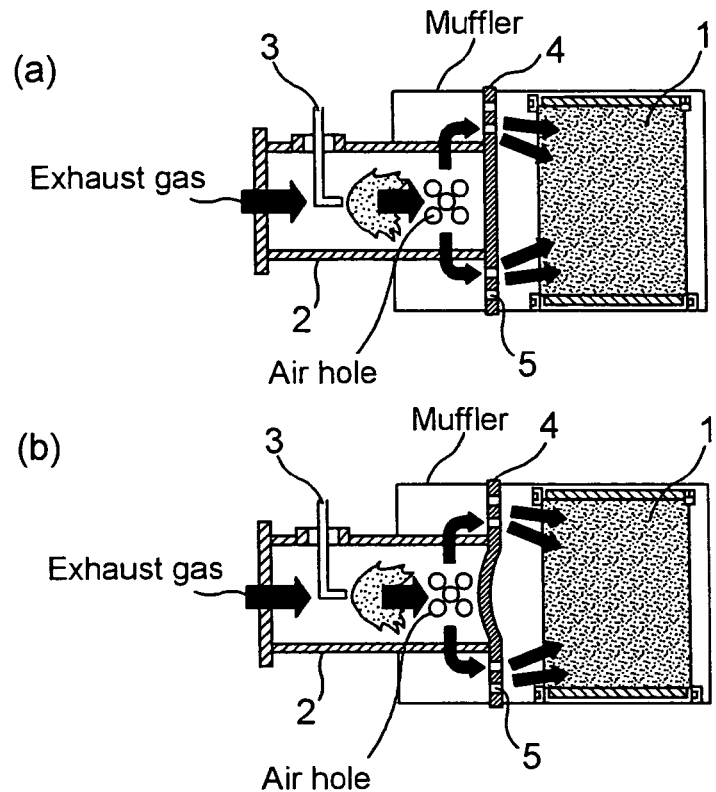
FIG. 4 shows the flow of exhaust gas flowing into an SCR catalyst 1 according to the first embodiment of the invention.

FIG. 4 shows the flow of exhaust gas flowing into the SCR catalyst 1 of the first embodiment. FIG. 4(a) shows the flow of exhaust gas in the case where a flat plate 4 having the air holes 5 is provided, and FIG. 4(b) shows the flow of exhaust gas in the case where a convex plate 4 having the air holes 5 is provided.

As shown in FIG. 4, the exhaust pipe 2 is closed by the center of the plate 4 having no air holes 5, and thus, exhaust gas cannot directly pass through the plate 4. The exhaust gas passes through air holes in the exhaust pipe 2 and flows outside the exhaust pipe, and then, passes through the air holes 5 in the outer area of the plate 4 and flows into the SCR catalyst 1.

At this time, the air holes 5 in the plate 4 disperse and make the flow of the exhaust gas uniform, thereby making the flow of the exhaust gas flowing into the SCR catalyst 1 be in a good condition. Note that in the case of FIG. 4(b), the flow of the exhaust gas is more dispersed and made uniform to become better because of the resistance of the convex than in the case of FIG. 4(a).

Figure 5:
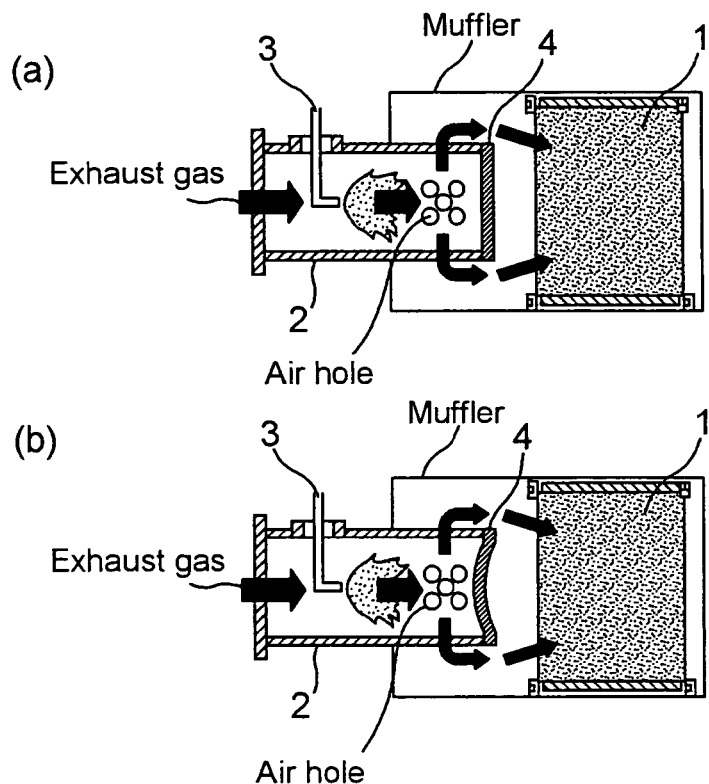
FIG. 5 shows the flow of exhaust gas flowing into the SCR catalyst 1 in the case where only the exhaust pipe 2 is closed by the plate 4 having no air hole according to the first embodiment of the invention.

FIG. 5 shows the flow of exhaust gas in the case where only the exhaust pipe 2 is closed by the plate 4 having no air hole as shown in FIG. 2.

Also in this case, since being blocked by the center of the plate 4 having no air hole, exhaust gas passes through the air holes in the exhaust pipe 2 and flows outside the exhaust pipe, but since the space between the muffler and the exhaust pipe 2 is not closed by the plate 4, the exhaust gas flows into the SCR catalyst 1 without any disturbance. Thus, although the flow of exhaust gas is not dispersed and made uniform by the air holes of the plate as in FIG. 4, the flow of the exhaust gas flowing into the SCR catalyst 1 is in a good condition as compared to the case where no plate 4 is provided.

If the flow of the exhaust gas flowing into the SCR catalyst 1 is in a good condition as above, the rate at which nitrogen oxide (NOx) contained in exhaust gas is absorbed into the SCR catalyst 1 increases, thus improving the efficiency of purging nitrogen oxide (NOx).

SECOND EMBODIMENT

Next, a second embodiment of the present invention will be described, where the same reference numerals denote the same or like parts as in the first embodiment while different or newly added parts are denoted by new reference numerals.

FIG. 6 is a basic schematic view of an SCR muffler according to a second embodiment of the present invention. The SCR muffler comprises an SCR catalyst 1 for selectively reducing and purging nitrogen oxide (NOx) contained in exhaust gas, an exhaust pipe 2 that allows exhaust gas to flow into the SCR catalyst 1, and a reducing agent, etc., supplying nozzle 30 that supplies a reducing agent or a reducing agent precursor to exhaust gas, and the reducing agent, etc., supplying nozzle 30 is inserted through a plate 40 having air holes 5, which is held in the exhaust pipe 2.

FIG. 6(a) shows an SCR muffler wherein the reducing agent, etc., supplying nozzle 30 is inserted at the end through the plate 40 having bent portions (shaped like an R or a bulge, or flat), and by fixing the bent portions to the inside of the exhaust pipe 2, the plate 40 is held in the exhaust pipe 2. Meanwhile, FIG. 6(b) shows an SCR muffler wherein the reducing agent, etc., supplying nozzle 30 is inserted at the end through the cone-shaped plate 40, and by sandwiching bent portions on the bottom side between flanges and fixing them, the plate 40 is held in the exhaust pipe 2.

In the SCR muffler having such a configuration, exhaust gas passes through the exhaust pipe 2 in a direction from upstream to downstream and flows into the SCR catalyst 1. Exhaust gas flowing through the SCR muffler is supplied via the reducing agent, etc., supplying means 30 with a reducing agent or a reducing agent precursor during the time before flowing into the SCR catalyst 1.

In this invention, the reducing agent, etc., supplying nozzle 30 is inserted through the plate 40 having air holes 5 and the plate 40 is held in the exhaust pipe 2. Hence, vibrations that are caused by vibrations of the vehicle, exhaust gas, and the like, to which the reducing agent, etc., supplying nozzle 30 is subject, are suppressed or reduced. As a result, a reducing agent or a reducing agent precursor such as urea water is supplied by spraying to exhaust gas in such a way as to be dispersed uniformly. Also, the reducing agent, etc., supplying nozzle 30 is improved in durability since being reinforced by the plate 40.

FIG. 7 is a projection view of the inside of the exhaust pipe of the SCR muffler according to the second embodiment of the invention as seen in the direction from upstream to downstream. Exhaust gas passes through the air holes 5 of the plate 40 and flows in the direction from upstream to downstream. Also, the reducing agent, etc., supplying nozzle 30 is inserted through the center of the plate 40, and a reducing agent or a reducing agent precursor such as urea water is supplied by spraying in the direction from upstream to downstream to be mixed and in contact with exhaust gas in such a way as to be dispersed uniformly.

The plate 40 of the invention may be shaped in any of a circle, ellipse, square, cone, and other polygons, and may be flat, convex, or in any shape. The plate 40 preferably has such a size as to close the mouth of the exhaust pipe 2. There may be one plate 40 or a plurality of plates 40.

As to the way in which the reducing agent, etc., supplying nozzle 30 is inserted through the plate 40, the end of the reducing agent, etc., supplying nozzle 30 is inserted at the end through the plate 40, and the plate 40 is preferably fixed to the reducing agent, etc., supplying nozzle 30 in a state where the end of the nozzle protrudes slightly.

As to the way in which the plate 40 is held in the exhaust pipe 2, the plate 40 may be fixed to the inside of the exhaust pipe 2, or sandwiched and fixed between outer flanges of the exhaust pipe 2, among other ways.

Exhaust gas flows further in the downstream direction and flows into the SCR catalyst 1, where nitrogen oxide (NOx) contained in the exhaust gas is absorbed into the SCR catalyst 1 and selectively reduced and purged. As a result, the nitrogen oxide (NOx) is transformed into nitrogen and water, which are gentle to the environment.

In the invention, exhaust gas flowing into the SCR catalyst 1 is sufficiently mixed and in contact with a reducing agent or a reducing agent precursor such as urea water, and thereby the rate at which nitrogen oxide (NOx) contained in the exhaust gas is absorbed into the SCR catalyst 1 becomes high. Thus, the efficiency of the SCR catalyst 1 purging nitrogen oxide (NOx) is improved.

The present invention may be embodied as a combination of the first and second embodiments. In this case, the flow of exhaust gas flowing through the SCR muffler becomes good, and vibrations that are caused by vibrations of the vehicle, exhaust gas, and the like, to which the reducing agent, etc., supplying nozzle is subject, are suppressed or reduced. As a result, the efficiency of the SCR catalyst purging nitrogen oxide (NOx) is improved, and the durability of the reducing agent, etc., supplying nozzle is improved.

INDUSTRIAL APPLICABILITY

According to the present invention, the flow of exhaust gas flowing through the SCR muffler becomes good, thus improving the efficiency of purging nitrogen oxide (NOx) contained in exhaust gas.

Further, the SCR muffler according to the present invention suppresses or reduces vibrations that are caused by vibrations of the vehicle, exhaust gas, and the like, to which the reducing agent, etc., supplying nozzle is subject, thus improving the efficiency of the SCR catalyst purging nitrogen oxide (NOx) and the durability of the reducing agent, etc., supplying nozzle as well.

What is claimed is:

1. An SCR muffler which comprises:

an SCR catalyst for selectively reducing and purging nitrogen oxide (NOx) contained in exhaust gas;

an exhaust pipe that allows the exhaust gas to flow into the SCR catalyst and has air holes in its portion to be inserted into the muffler; and a reducing agent supplying means that supplies a reducing agent or a reducing agent precursor to the exhaust gas, characterized in that a plate having air holes which disperse and make a flow of the exhaust gas uniform is attached to an end of the exhaust pipe and greater in diameter than the exhaust pipe, and the air holes are arranged only in an area outside the diameter of the exhaust pipe, and in that the plate has a cross section shaped like a convex tapering upstream only in an area within the diameter of the exhaust pipe.

* * * * *